(12) United States Patent
Zhang et al.

(10) Patent No.: US 11,061,267 B2
(45) Date of Patent: Jul. 13, 2021

(54) DISPLAY DEVICE

(71) Applicant: Keewin Display Co., Ltd., Shanghai (CN)

(72) Inventors: Qianzhong Zhang, Shanghai (CN); Rubin Sun, Shanghai (CN)

(73) Assignee: Keewin Display Co., Ltd., Shanghai (CN)

( * ) Notice: Subject to any disclaimer, the term of this patent is extended or adjusted under 35 U.S.C. 154(b) by 0 days.

(21) Appl. No.: 16/845,733

(22) Filed: Apr. 10, 2020

(65) Prior Publication Data
US 2020/0393720 A1 Dec. 17, 2020

(30) Foreign Application Priority Data

Jun. 14, 2019 (CN) .......................... 201910519069.8

(51) Int. Cl.
*G02F 1/1333* (2006.01)

(52) U.S. Cl.
CPC .. *G02F 1/133382* (2013.01); *G02F 1/133308* (2013.01); *G02F 1/133328* (2021.01)

(58) Field of Classification Search
CPC ......... G02F 1/133308; G02F 1/133615; G02F 1/133317; G02F 1/133628; G02F 1/133603; G02F 1/133385; G02F 1/1336; G02F 1/1333; G02F 1/133328; G02F 1/133382; G02F 1/1335; G02F 2201/36; G02B 6/0085; G02B 7/1815
See application file for complete search history.

(56) References Cited

U.S. PATENT DOCUMENTS

| 2006/0070280 A1* | 4/2006 | Yamamura | ............ | G06F 1/1601 40/564 |
| 2020/0337185 A1* | 10/2020 | Choi | .................. | H05K 7/20336 |

* cited by examiner

*Primary Examiner* — Thoiv Duong
(74) *Attorney, Agent, or Firm* — Wang Law Firm, Inc.

(57) ABSTRACT

The present invention relates to a display device including an outer frame and a display module disposed in the outer frame and being characterized in that sides of the outer frame are provided with heat radiating outlets, the display module includes a mounting frame, heat radiating structures corresponding to the heat radiating outlets are formed on the mounting frame, and the heat radiating structures communicate with the outside by virtue of the heat radiating outlets. According to the display device provided by the present invention, the heat radiating structures are formed on the mounting frame to radiate heat of the display module, and the outer frame is provided with the heat radiating outlets by which the heat radiating structures communicate with the outside, so that the heat of the display module is directly radiated to the outside by virtue of the heat radiating structures, a heat radiating effect is improved, and a problem of relatively poor heat radiating effect caused by shielding of a wire and a circuit board and package of an outer frame in an existing side-entry-type display is solved.

8 Claims, 15 Drawing Sheets

DISPLAY DEVICE

BACKGROUND

Technical Field

The present invention relates to the field of screen display and in particular to a display device.

Related Art

A liquid crystal display has played a leading role in the current flat panel display market due to the characteristics of small size, low power consumption and low radiation. In the liquid crystal display, since a liquid crystal does not emit light, it merely plays a role in controlling a ray, and therefore, a BLU (Back Light Unit) is required to be configured for a liquid crystal display panel in order to display an image on a screen of the liquid crystal display.

Generally speaking, the BLU may be divided into a side-entry-type BLU and a direct-light-type BLU according to different light source distribution positions in the BLU, wherein a light source in the side-entry-type BLU is located at the side surface of the display panel, and a light source in the direct-light-type BLU is located at the bottom of the display panel.

As shown in FIG. 1 in which a side-entry-type display in the existing technology is shown, the side-entry-type display includes an outer frame 10 and a display module 12 disposed in the outer frame 10, the display module 12 further includes a mounting frame 121 and a light bar 122 arranged at an inner side of the mounting frame 121 and further includes a reflector plate 124, a light guide plate 125, an optical film 123 and liquid crystal glass 126 sequentially arranged on the mounting frame 121 from bottom to top, the liquid crystal glass 126 is connected with a control component for controlling the liquid crystal glass 126 to display a frame, and the control component includes a circuit board 1272 and a wire 1271. The front of the outer frame 10 is provided with protective glass 11, and the protective glass 11 is arranged corresponding to the liquid crystal glass 126. The control component is generally arranged in a way of bypassing the side of the mounting frame 121 from the front side of the mounting frame 121 and attaching to the rear side of the mounting frame 121, in this way, the circuit board 1272 is attached to the rear side of the mounting frame 121, and the wire 1271 connected with the liquid crystal glass 126 coats the mounting frame 121. On the one hand, due to the coating and blocking of the wire 1271, the heat radiating effect of the display is relatively poor, and on the other hand, due to the coverage of the outer frame 10, the heat radiating effect of the display is also relatively poor, particularly, the temperature of the overall display is overhigh under the condition of high brightness, furthermore, the service life of the light bar is shortened, the light bar needs to be replaced frequently, and thus, the use cost of the display is increased.

SUMMARY

The purpose of the present invention is to provide a display device to overcome defects in the existing technology and solve the problems in an existing side-entry-side display that the overall heat radiating effect of the display is relatively poor, the service life of a light bar is shortened and the use cost of the display is increased due to arrangement ways of a circuit board and a wire thereof and package of an outer frame.

A technical solution for achieving the above-mentioned purpose is that:

The present invention provides a display device including an outer frame and a display module disposed in the outer frame. Sides of the outer frame are provided with heat radiating outlets, the display module includes a mounting frame, heat radiating structures corresponding to the heat radiating outlets are formed on the mounting frame, and the heat radiating structures communicate with the outside by virtue of the heat radiating outlets.

According to the display device provided by the present invention, the heat radiating structures are formed on the mounting frame to radiate heat of the display module, and the outer frame is provided with the heat radiating outlets by which the heat radiating structures communicate with the outside, so that the heat of the display module is directly radiated to the outside by virtue of the heat radiating structures, the heat radiating effect is improved, and the problem of relatively poor heat radiating effect caused by shielding of a wire and a circuit board and package of an outer frame in an existing side-entry-side display is solved. Due to the adoption of the heat radiating structures of the display device, the overall heat radiation effect of the display device is improved, the service life of each functional board (particularly a light bar serving as a heat source) in the display module is guaranteed, and the problem that the use cost is increased due to frequent replacement of the functional board is avoided. The heat radiating structures of the display device are formed on the mounting frame, so that the heat radiating structures may be located on a same plane with the mounting frame of the display module without affecting an overall thickness of the display device, and furthermore, the display device may conform to a design concept of thinning as a whole.

A further improvement on the display device provided by the present invention lies in that at least parts of the heat radiating structures extend from the heat radiating outlets to an outer side of the outer frame.

A further improvement on the display device provided by the present invention lies in that the heat radiating structures are side frames of the outer frame.

A further improvement on the display device provided by the present invention lies in that the display module further includes a control component, and the control component is approximately spread along an arrangement direction of the heat radiating structures.

A further improvement on the display device provided by the present invention lies in that the heat radiating structures are located at an outer side of the control component.

A further improvement on the display device provided by the present invention lies in that the display module further includes an extension section, a first end of the extension section is connected to the mounting frame, a second end of the extension section extends in a direction far away from the mounting frame, and the heat radiating structures are formed on the second end of the extension section.

A further improvement on the display device provided by the present invention lies in that the heat radiating structures are hollow heat radiating pipelines, and two ends of the heat radiating pipelines are provided with openings communicating with inside and outside air.

A further improvement on the display device provided by the present invention lies in that the heat radiating pipelines are vertically arranged.

A further improvement on the display device provided by the present invention lies in that wall surfaces of the heat radiating pipelines are provided with heat radiating fins.

DETAILED DESCRIPTION

The present invention will be further described with reference to the accompanying drawings and specific embodiments.

Figure 3:
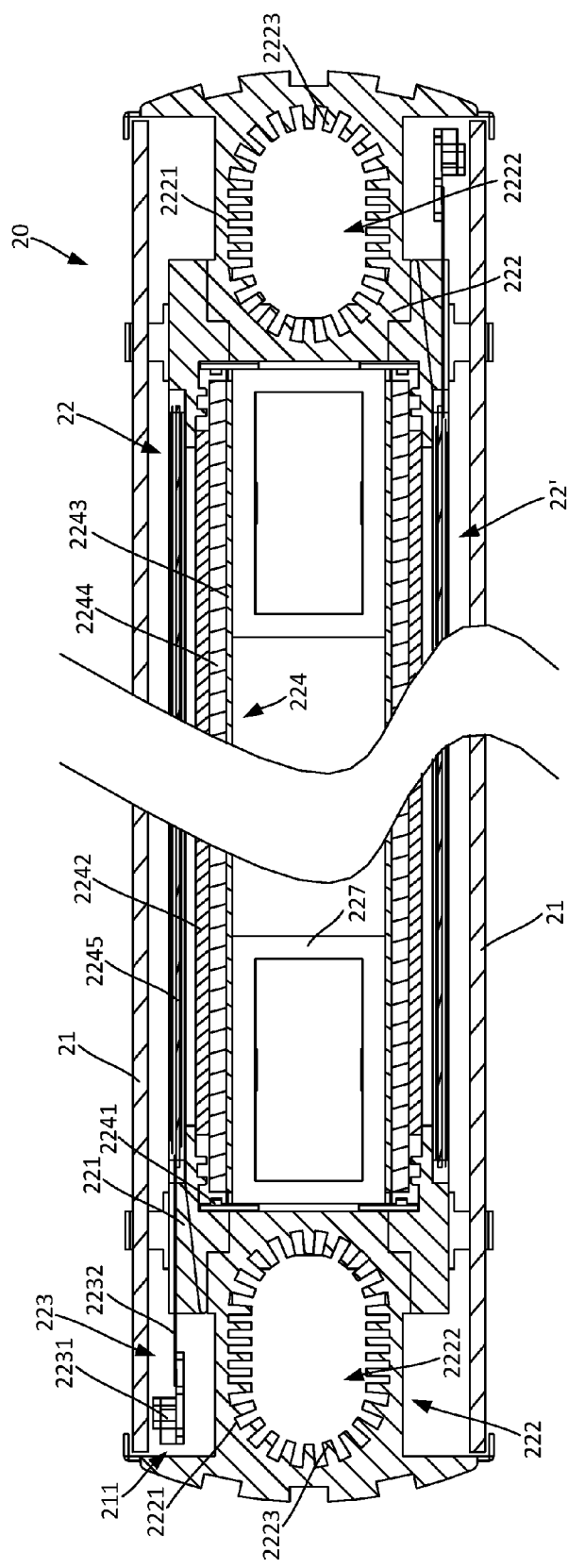
FIG. 3 is a sectional view of a second embodiment of the display device provided by the present invention.

Referring to FIG. 3, the present invention provides a display device for solving a heat radiation problem of an existing display. The display device provided by the present invention may be a double-sided display device or a single-sided display device. According to the display device provided by the present invention, heat radiating structures are formed on a mounting frame, and heat radiating outlets are formed in an outer frame to ensure that the heat radiating structures communicate with the outside, so that a heat radiating effect of the display device is improved, the display device may be fabricated with high brightness, and the display device may also conform to a design concept of thinning as a whole. The display device provided by the present invention is described below in combination with accompanying drawings.

Figure 2:
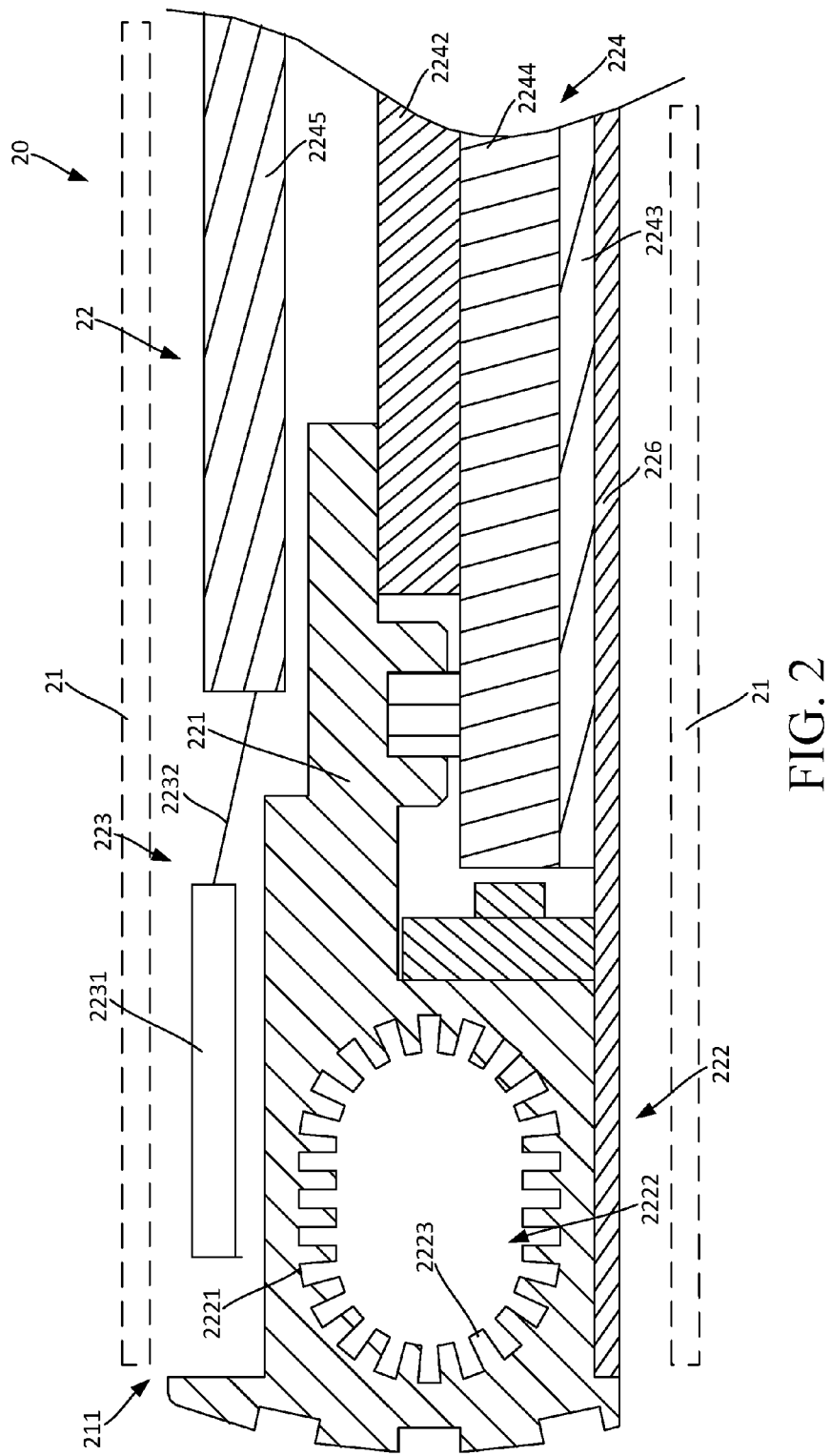
FIG. 2 is a sectional view of one side in a first embodiment of a display device provided by the present invention.

Referring to FIG. 2 in which a sectional view of one side in a first embodiment of a display device provided by the present invention is shown, a structure of the display device provided by the present invention is described below in combination with FIG. 2.

As shown in FIG. 2, a display device 20 provided by the present invention includes an outer frame 21 and a display module 22 disposed in the outer frame 21, and sides of the outer frame 21 are provided with heat radiating outlets 211; and the display module 22 includes a mounting frame 221, heat radiating structures 222 corresponding to the heat radiating outlets 211 are formed on the mounting frame 221, and the heat radiating structures 222 communicate with the outside by virtue of the heat radiating outlets 211.

The heat radiating structures 222 communicate with the outside by virtue of the heat radiating outlets 211 formed in the sides of the outer frame 21, and the display module 22 is cooled by virtue of heat exchange between outside air and the heat radiating structures 222, so that a good heat radiating effect is achieved, an overhigh temperature inside the display module 22 is avoided, accordingly, a service life of the display module 22 is also prolonged, and requirements for high brightness and thinning of the display module 22 are also met.

In one specific embodiment, the heat radiating structures 222 are completely disposed in the outer frame 21 and are arranged close to the heat radiating outlets 211.

In one specific embodiment, at least parts of the heat radiating structures 222 extend from the heat radiating outlets 211 to an outer side of the outer frame 21. Parts of the heat radiating structures 222 are guided to the outer side of the outer frame 21, so that parts of the heat radiating structures 222 are directly exposed to outside to exchange heat with the outside air, and furthermore, the heat radiating effect is improved.

In one specific embodiment, a plurality of heat radiating outlets 211 are arranged in the outer frame 21 and are distributed at the sides of the outer frames 21 at intervals.

Figure 6:
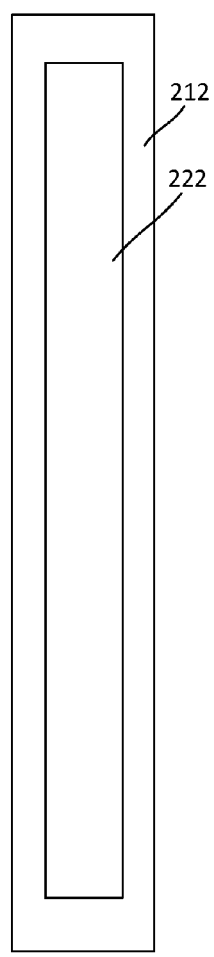
FIG. 6 is a schematic structural view of side frames in a third embodiment of the display device provided by the present invention.
Figure 7:
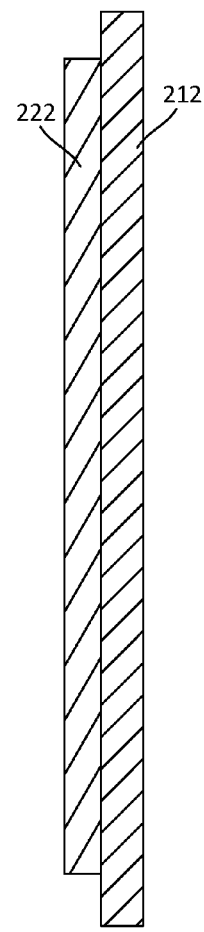
FIG. 7 is a sectional view of the structure as shown in FIG. 6.

In one specific embodiment, the sides of the outer frame 21 are provided with side frames, as shown in combination with FIG. 6 and FIG. 7, the side frames 212 are provided with heat radiating outlets of which lengths are adapted to those of the heat radiating structures 222, and parts of ends of the heat radiating structures 222 extend out of the heat radiating outlets and are disposed at the outer side of the outer frame 21.

In one specific embodiment, as shown in FIG. 2 and FIG. 3, the heat radiating structures 222 are the side frames of the outer frame 21. Since the heat radiating structures 222 are directly used as the side frames of the outer frame 21, on the one hand, the structure of the display device is simplified, namely the side frames at two sides of the outer frame 21 are omitted and are directly replaced with the heat radiating structures 222; and on the other hand, the heat radiating structures 222 serving as the side frames may be directly and completely exposed to outside, so that heat radiating efficiency is increased.

In one specific embodiment, as shown in FIG. 2 and FIG. 3, the heat radiating structures 222 are hollow heat radiating pipelines 2221, and two ends of the heat radiating pipelines 2221 are provided with openings 2222 communicating with inside and outside air.

Insides of the heat radiating pipelines 2221 are hollow, and the two ends of the heat radiating pipelines 2221 are provided with the openings communicating with the insides, so that the insides of the heat radiating pipelines 2221 communicate with the outside air through the openings, heat (the heat is mainly from a light bar inside the display module) generated by the display module 22 is transferred to the heat radiating pipelines 2221 through the mounting frame 221, so that a temperature of air inside the heat radiating pipelines 2221 is raised, while a temperature of the outside air is relatively low, furthermore, the air rapidly convects along the heat radiating pipelines 2221 under an action of a density difference, namely a chimney effect is generated, a phenomenon of enhanced convection of the air inside the heat radiating pipelines 2221 is caused to realize rapid heat radiation for the mounting frame 221 and a functional board, and thus, the heat radiating effect is improved.

In one specific embodiment, the heat radiating pipelines 2221 are vertically arranged. Preferably, lengths of the heat radiating pipelines 2221 are consistent with a length of the mounting frame 221.

Two opposite sides of the mounting frame 221 are provided with the heat radiating pipelines 2221, and air convection is formed by virtue of the chimney effect, so that the heat radiating effects of the mounting frame and the functional board are improved.

In one specific embodiment, as shown in FIG. 2 and FIG. 3, in order to improve the heat radiating effect of the heat radiating pipelines 2221, wall surfaces of the heat radiating pipelines 2221 are provided with heat radiating fins 2223. The heat radiating fins 2223 may be arranged on inner wall surfaces of the heat radiating pipelines 2221, or outer wall surfaces of the heat radiating pipelines 2221 or both the inner wall surfaces and the outer wall surfaces of the heat radiating pipelines 2221. The heat radiating effects of the heat radiating pipelines 2221 may be improved by virtue of the heat radiating fins 2223.

Figure 1:
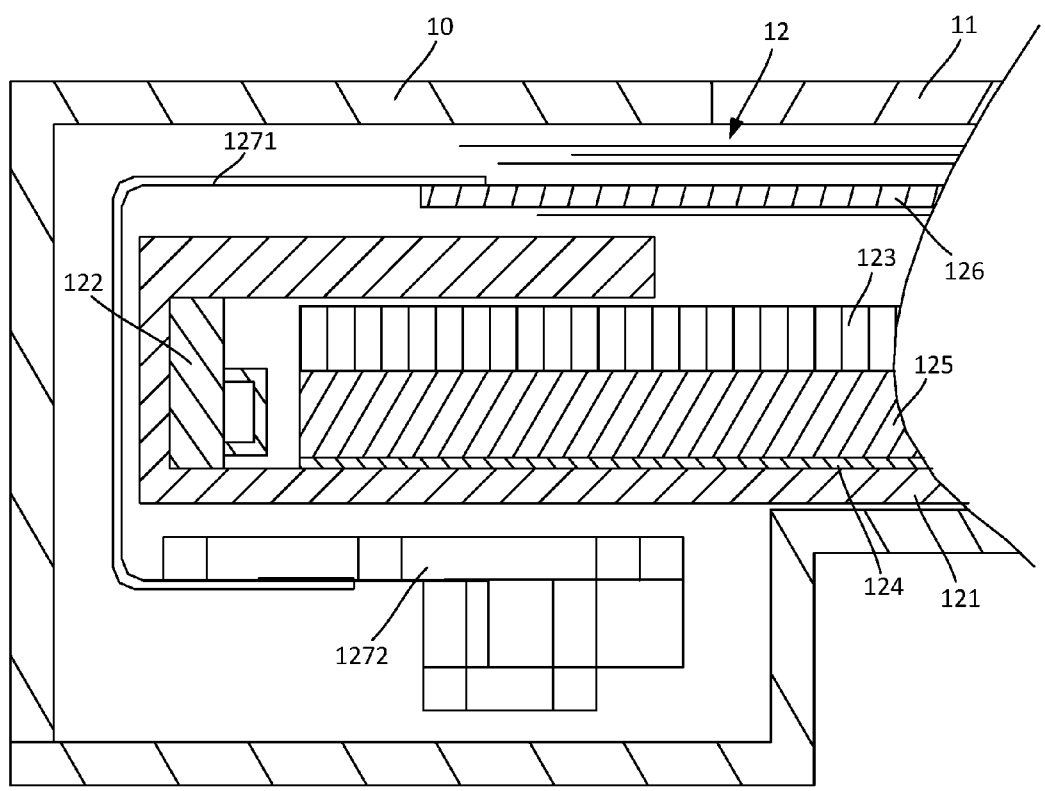
FIG. 1 is a sectional view of one side of a side-entry-type display in the existing technology.

In one specific embodiment, as shown in FIG. 2 and FIG. 3, the display module 22 further includes a control component 223, and the control component 223 is approximately spread along an arrangement direction of the heat radiating structures 222. Compared with an existing structure as shown in FIG. 1, namely an arrangement way that the control component coats and shields the mounting frame, the control component 223 of the display device provided by the present invention is spread along the arrangement direction of the heat radiating structures 222 after being guided out of the display module 22, so that the control component 223 may not coat or block the heat radiating structures 222, a heat radiating function is prevented from being affected, and the heat radiating effect is improved.

Figure 4:
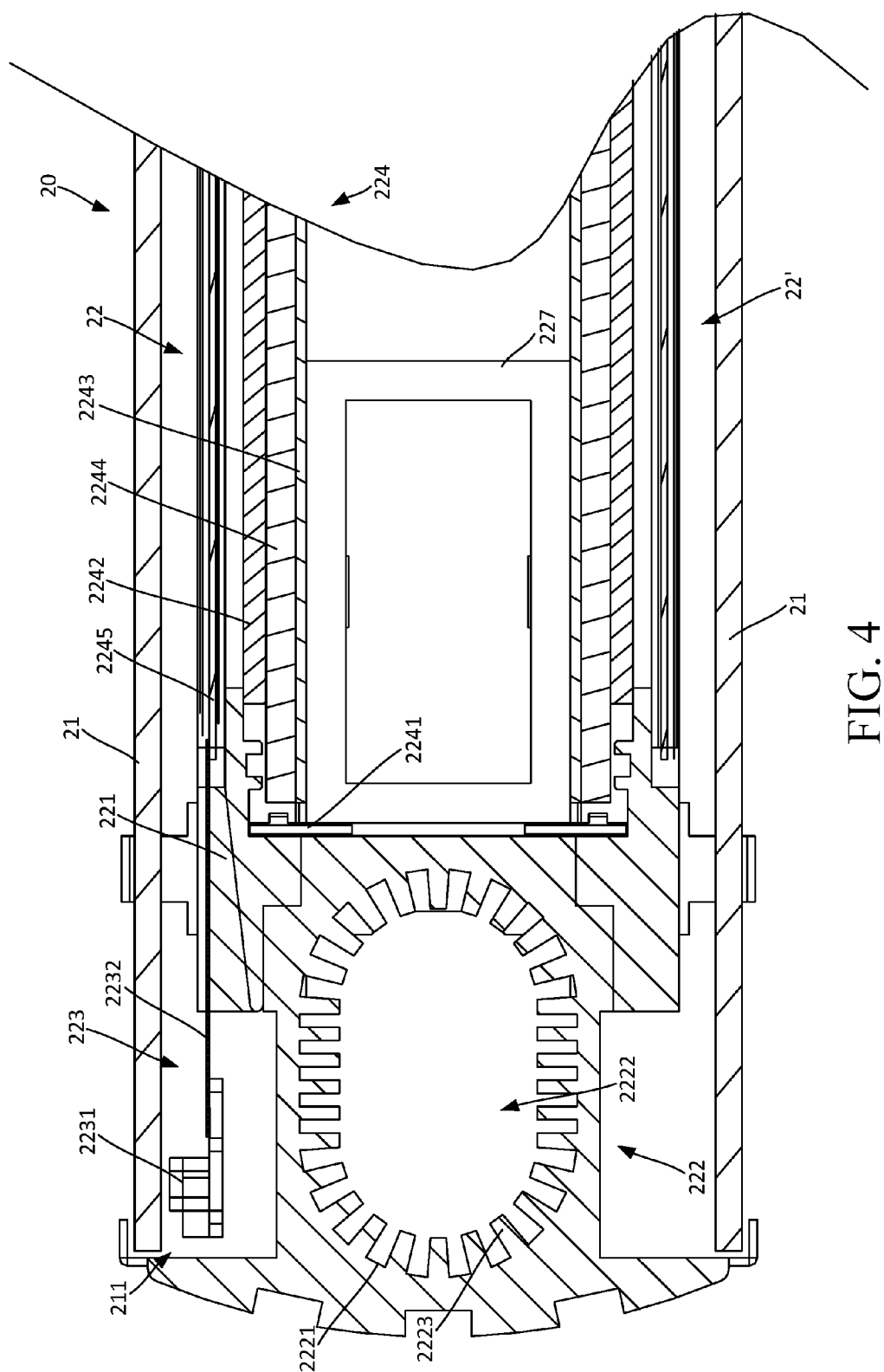
FIG. 4 is a schematic partial enlarged view of one side in FIG. 3.
Figure 5:
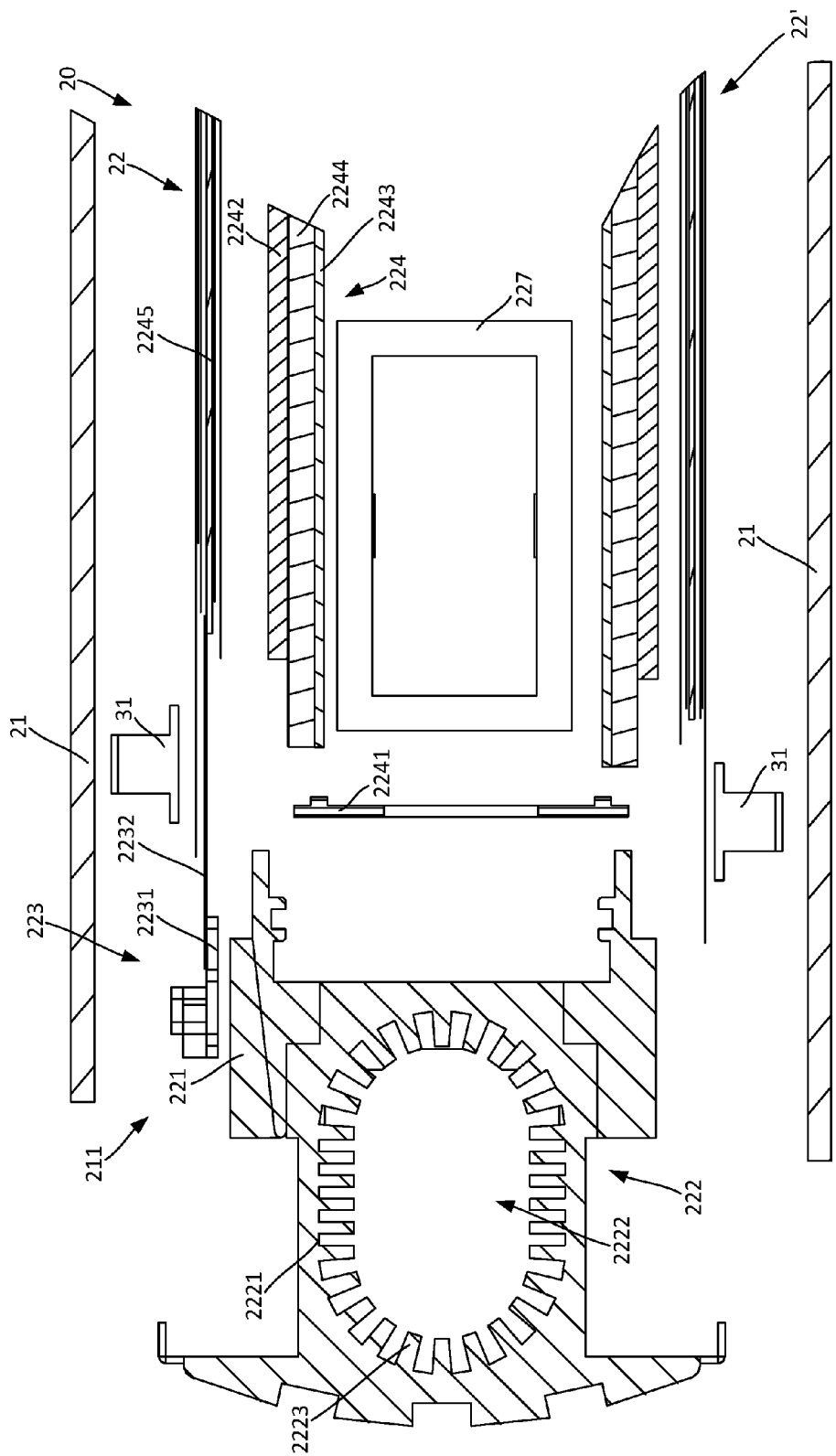
FIG. 5 is a schematic explosive structural view of a structure as shown in FIG. 3.

Further, as shown in FIG. 2, FIG. 4 and FIG. 5, the control component 223 includes a PCB 2231 (Printed Circuit Board) and a COF 2232 (Chip On Flex or Chip On Film) connected with the PCB 2231, and the COF 2232 includes a wire and a chip arranged on the wire. The control component 223 is configured to control the frame display of a functional board 224 in the display module 22. According to the display module 22 provided by the present invention, the PCB 2231 and the COF 2232 are directly spread along the arrangement direction of the heat radiating structures 222 so that influences of the arrangement of the PCB 2231 and the COF 2232 to a heat transfer path is avoided, the heat radiating structures 222 are directly formed on the mounting frame 221 to ensure that heat generated by the functional board in the mounting frame 221 may be directly transferred to the heat radiating structures 222 through the mounting frame and is further radiated through the heat radiating structures 222, so that the heat radiation for the functional board 224 is realized, and the heat radiating effect is guaranteed.

Figure 8:
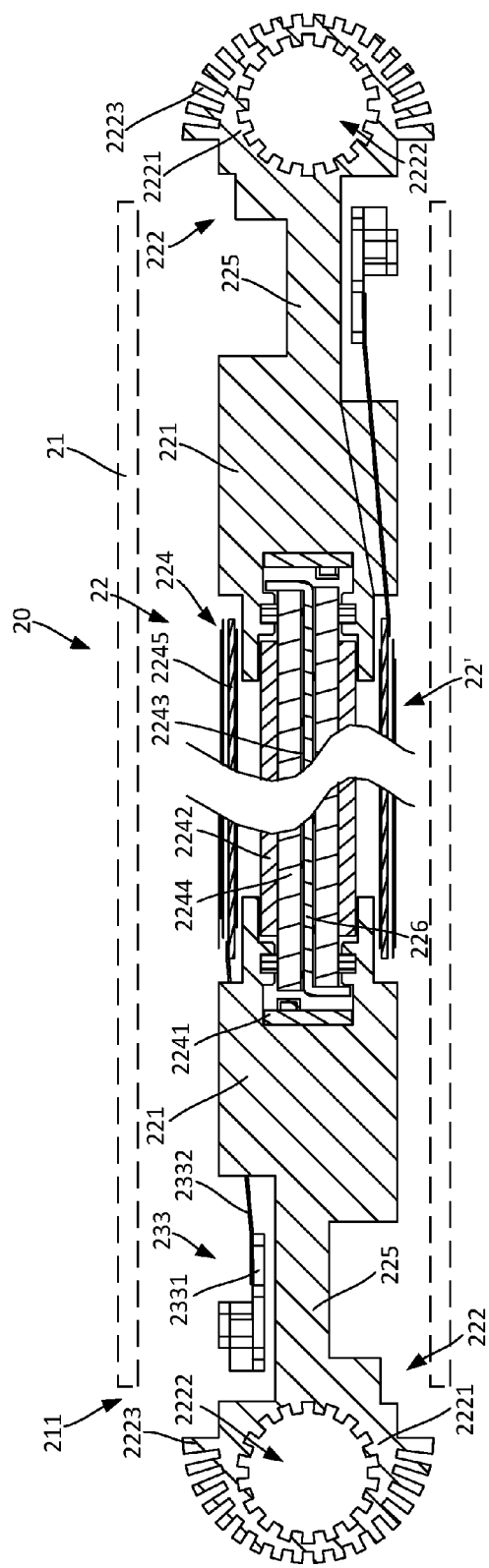
FIG. 8 is a sectional view of a fourth embodiment of the display device provided by the present invention.
Figure 9:
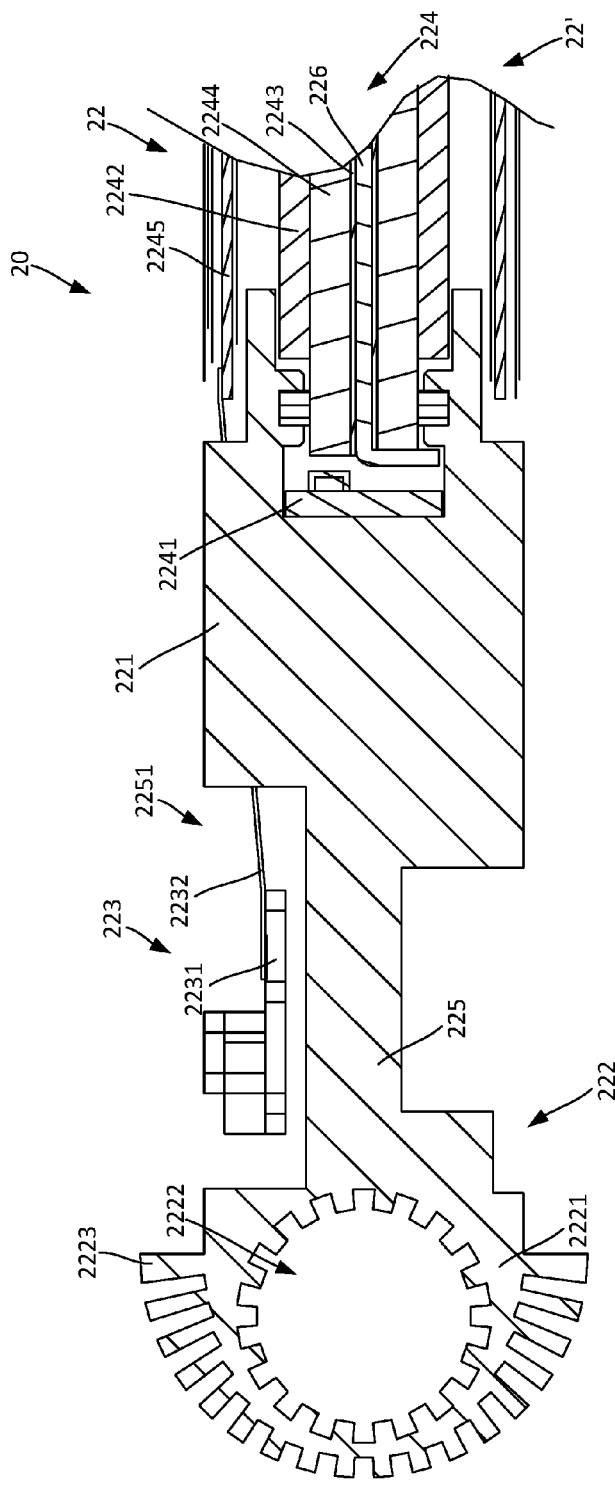
FIG. 9 is a schematic partial enlarged view of one side in a structure as shown in FIG. 8.

In one specific embodiment, as shown in FIG. 8 and FIG. 9, the display module 22 further includes an extension section 225, a first end of the extension section 225 is connected to the mounting frame 221, a second end of the extension section 225 extends in a direction far away from the mounting frame 221, and the heat radiating structures 222 are formed on the second end of the extension section 225. The heat radiating structures 222 are guided to an outer side of the mounting frame 221 by virtue of the arranged extension section 225, so that influences of the control component 223 to the heat radiating structures 222 may be avoided, and the heat radiating effect of the heat radiating structures 222 may be improved.

Further, the second end of the extension section 225 extends in the direction far away from the mounting frame 221 to an outer side of the control component 223, and furthermore, the heat radiating structures 222 formed on the second end of the extension section 225 are located at the outer side of the control component 223, so that the control component may not affect the heat radiating effects of the heat radiating pipelines 2221 of the heat radiating structures 222, and the problem of heat radiation shielding and blocking of the control component in the existing display is solved.

Furthermore, corresponding to the control component 223, the extension section 225 is provided with an accommodating slot 2251 for accommodating the control component 223. Since the control component is accommodated by the accommodating slot 2251, the control component is hidden inside a structure to avoid affecting a thickness of the structure of the display device 20, so that the display device 20 may conform to the design concept of thinning.

In a first embodiment as shown in FIG. 2, a display device provided by the present invention is displayed as a single-sided display device, the display device 20 includes a display module 22, an outer frame 21 includes a front frame, a rear frame, a top frame and a bottom frame which are spliced to form a hollow square frame, heat radiating outlets are formed in two sides of the square frame, and heat radiating structures 222 serving as side frames are mounted at the heat radiating outlets, so that the two heat radiating structures 222 form the outer frame 21 together with the front frame, the rear frame, the top frame and the bottom frame. Heat radiating holes are formed in both the top frame and the bottom frame so as to further radiate heat inside the outer frame 21. The front frame is provided with protective glass corresponding to liquid crystal glass 2245 of the display module 22, and thus, not only may a display frame of the liquid crystal glass 2245 be watched, but also an effect of protecting the liquid crystal glass 2245 may be achieved. The display module 22 includes a functional board 224, the functional board 224 includes a light bar 2241, an optical film 2242, a reflector plate 2243, a light guide plate 2244 and the liquid crystal glass 2245, the light bar 2241 is attached to an inner side of the mounting frame 221, the liquid crystal glass 2245, the optical film 2242, the light guide plate 2244 and the reflector plate 2243 are sequentially arranged on the mounting frame 221 from front to back, and the mounting frame 221 is provided with corresponding mounting structures for mounting the liquid crystal glass 2245, the optical film 2242, the light guide plate 2244 and the reflector plate 2243. The light guide plate 2244 is arranged corresponding to a lamp source on the light bar 2241. One side, close to the bottom frame, on the reflector plate 2243 is provided with a reinforcing plate 226 for improving the structural strength and stability of the reflector plate 2243 and the display module 22. Preferably, the reinforcing plate 226 is an aluminum plate.

In the first embodiment, the heat radiating structures 222 and the mounting frame 221 are integrally molded. In the present embodiment, only one side is provided with a control component 223, and the side where the control component 223 is located is provided with the heat radiating structures 222. The other side (one side opposite to the control component 223) of the display module 22 may be provided with heat radiating structures, or may not be provided with the heat radiating structures and is only provided with a mounting frame.

In a second embodiment, as shown in FIG. 3 to FIG. 5, a display device 20 is a double-sided display device and includes two display modules, namely a display module 22 and a display module 22' arranged back to back, a structure of the display module 22' is same as that of the display module 22, but functional boards of the display module 22 and the display module 22' are arranged in a mirroring manner. A structure of an outer frame 21 in the display device 20 in the second embodiment is same as that of the outer frame 21 of the display device 20 in the first embodiment, but a rear frame of the outer frame 21 in the second embodiment is also provided with protective glass, so that a frame may be displayed in both a front frame and the rear frame. The display module 22 is mounted on a functional board 224 at an inner side of a mounting frame 221, the functional board 224 includes a light bar 2241, an optical film 2242, reflector plates 2243, a light guide plate 2244 and liquid crystal glass 2245, and an arrangement way of the functional board 224 is same as that in the first embodiment. A difference lies in that a reinforcing block 227 is arranged between the two reflector plates and is supported between the two reflector plates, and an end of the reinforcing block 227 abuts against the corresponding light bar, so that the reinforcing block 227 also plays a role in fixing the light bar. The front frame and the rear frame of the outer frame 21 are fixedly connected with the mounting frame 221 of the display module 22 by virtue of clamping pieces 31.

In the second embodiment, ends of the heat radiating structures 222 serving as side frames of the outer frame 21 are exposed to outside, a plurality of strip-shaped grooves are formed in end surfaces of the heat radiating structures 222, and heat radiating efficiency of the heat radiating structures 222 are increased by virtue of the grooves. In the second embodiment, the heat radiating structures 222 may be integrated or mutually spliced and connected with the mounting frame 221. Further, the sides, close to a control component 223, of the heat radiating structures 222 are provided with an accommodating slot for accommodating the control component 223.

In a third embodiment, as shown in FIG. 6 and FIG. 7, different from the first embodiment and the second embodiment, the third embodiment is characterized in that an outer frame 21 is provided with side frames 212, heat radiating outlets allowing ends of heat radiating structures 222 to extend out are formed in the side frames 212, and parts of the ends of the heat radiating structures 222 are directly exposed to outside after extending out of the heat radiating outlets.

Figure 10:
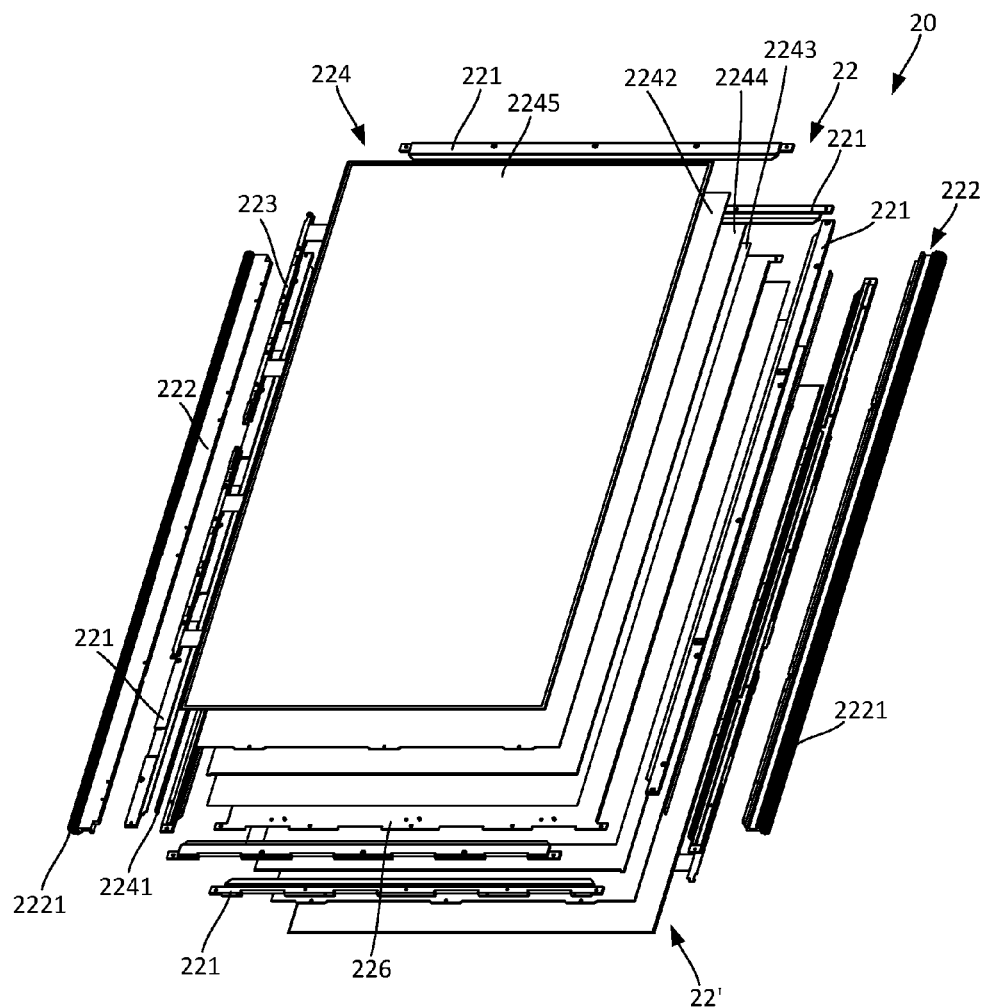
FIG. 10 is a schematic explosive structural view of the fourth embodiment of the display device provided by the present invention.
Figure 11:
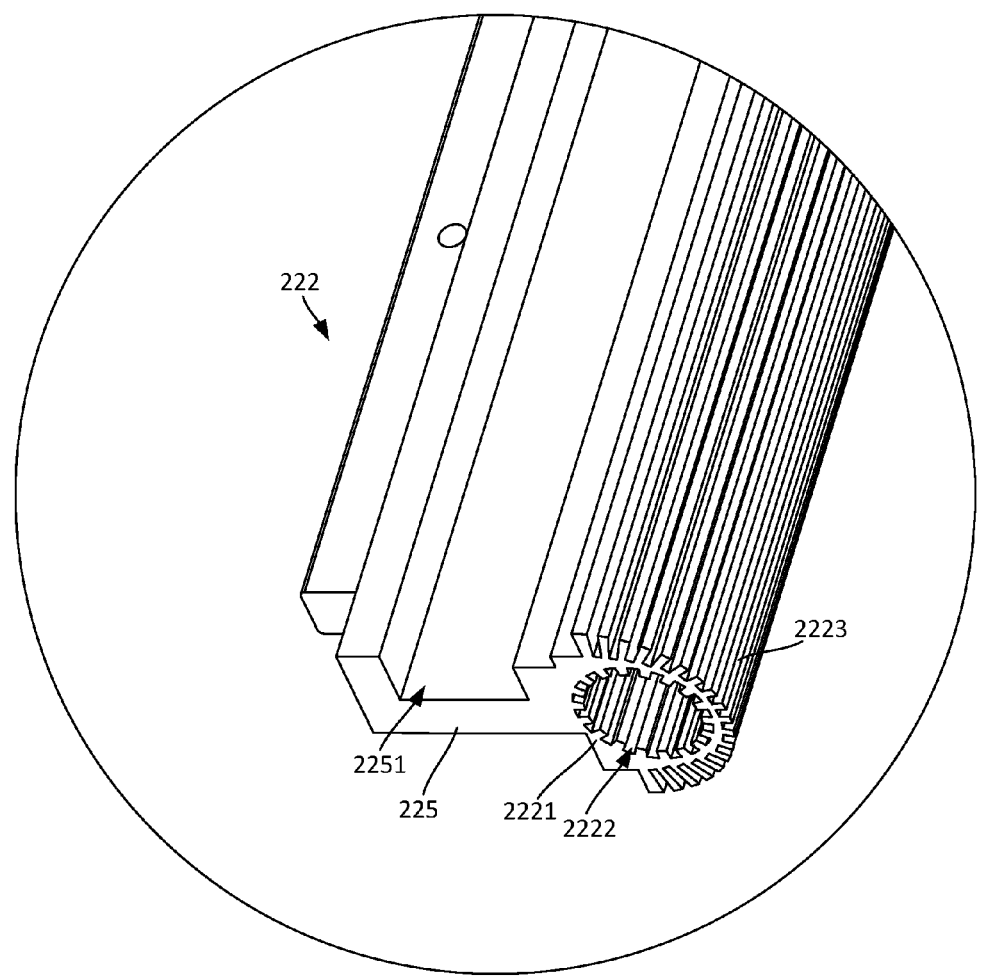
FIG. 11 is a schematic partial enlarged view of a heat radiating structure in FIG. 10.
Figure 12:
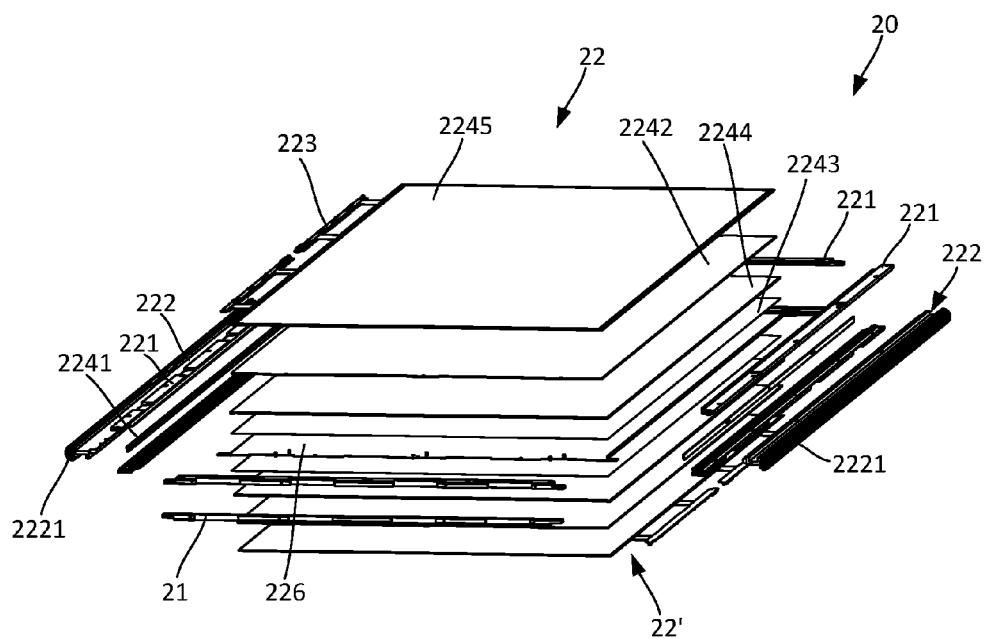
FIG. 12 is a schematic explosive structural view from another angle of the fourth embodiment of the display device provided by the present invention.
Figure 13:
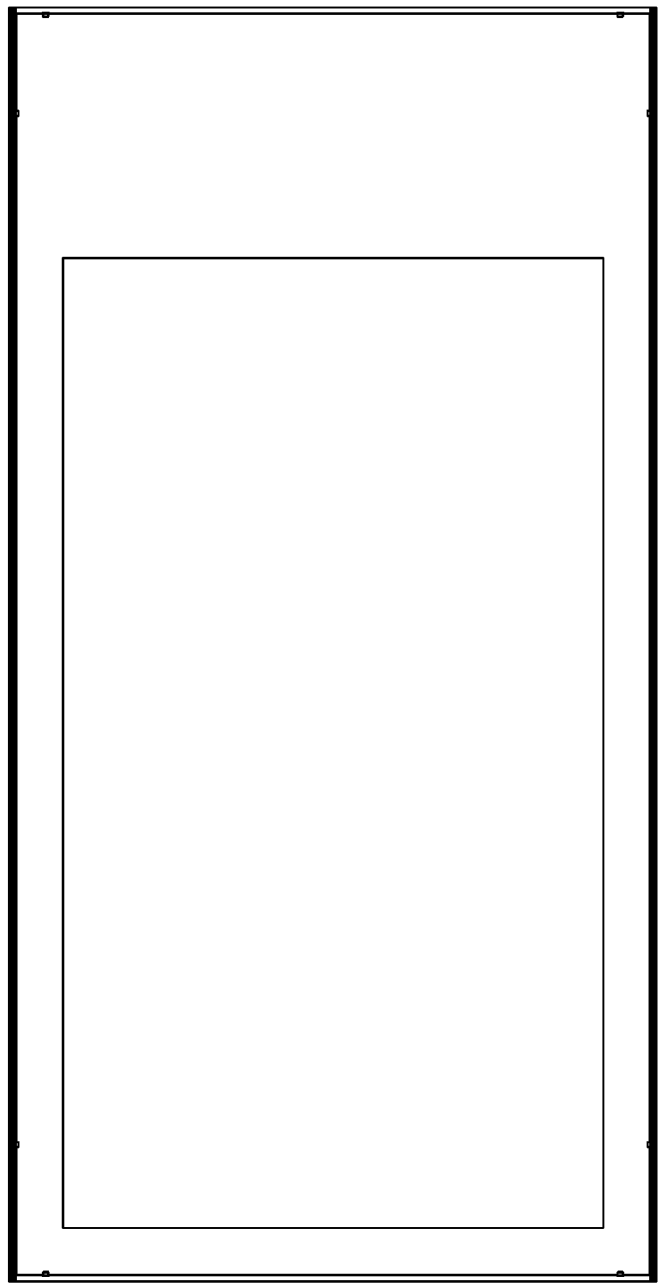
FIG. 13 is a front view of the fourth embodiment of the display device provided by the present invention.
Figure 14:
FIG. 14 is a side view of the fourth embodiment of the display device provided by the present invention.
Figure 15:
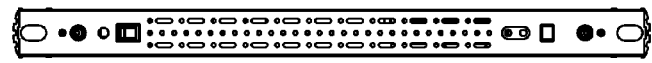
FIG. 15 is a top view of the fourth embodiment of the display device provided by the present invention.
Figure 16:
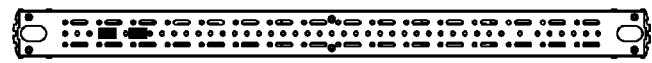
FIG. 16 is a bottom view of the fourth embodiment of the display device provided by the present invention.
Figure 17:
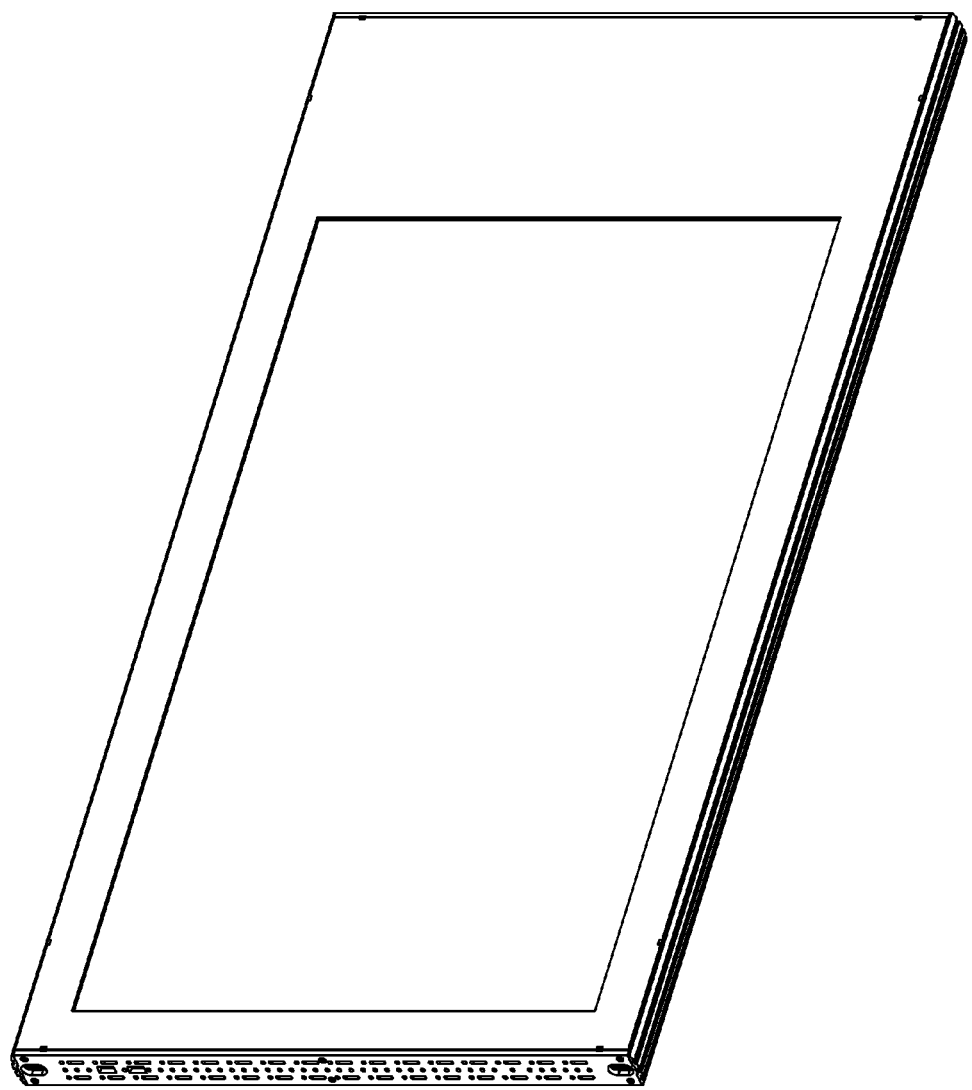
FIG. 17 and FIG. 18 are three-dimensional views of a shore end from two viewing angles of the fourth embodiment of the display device provided by the present invention.
Figure 18:

In a fourth embodiment, as shown in FIG. 8 and FIG. 9, the heat radiating structures 222 are formed at the second end of the extension section 225, namely the heat radiating structures 222 are located at the outer side of the control component 223. Since the heat radiating structures 222 are located at the outer side of the control component 223, and accordingly, the heat radiating pipelines 2221 are also located at the outer side of the control component 223. In other words, the heat radiating pipelines 2221 are located at the side, far away from the mounting frame 221, of the control component 223, and therefore, it is beneficial to the realization of heat radiation for the functional board in the display module 22 due to the air convection of the heat radiating pipelines 2221 at the outer side of the mounting frame 221. As shown in combination with FIG. 10 to FIG. 12, in the fourth embodiment, the display device 20 is a double-sided display device, the extension section 225 is provided with accommodating slots 2251 corresponding to two display modules, and notches allowing the COF 2232 of the control component 223 to penetrate are formed in corresponding surface of the mounting frame 221, so that parts corresponding to the COF 2232 are disposed in the notches, and the PCB 2231 is guided into the accommodating slots 2251. Due to the adoption of the above-mentioned structure, the display device 20 not only may meet the requirement for thinning, but also has an excellent heat radiating effect, the control component 223 horizontally extends and does not generate heat radiation shielding or blocking influences to the mounting frame 221 and the heat radiating structures 222, and thus, the heat radiating structures 222 may perform effective heat exchange on the mounting frame 221 and the two display modules so as to achieve a relatively good heat radiating effect.

In the fourth embodiment, the heat radiating structures 222 and the mounting frame 221 are integrally molded. Namely the heat radiating structures 222 are molded on the outer side surface of the mounting frame 221. In another preferable embodiment, the heat radiating structures 222 and the mounting frame 221 are connected in a splicing way, specifically, the ends, close to the mounting frame 221, on the heat radiating structures 222 are provided with extension blocks, and the outer side surface of the mounting frame 221 is provided with splicing slots corresponding to the extension blocks; and the extension blocks are inserted into the splicing slots and are firmly connected through screws, and thus, the heat radiating structures 222 and the mounting frame 221 are firmly connected.

In the fourth embodiment, the structures of the two display modules are same as those of the display modules in the second embodiment, a difference lies in that reinforcing structures arranged between the reflector plates are different, in the fourth embodiment, a reinforcing plate 226 is arranged between the reflector plates of the two display modules and is configured to provide beneficial supporting and reinforcing effects for each functional board of the two display modules, so that each functional board has relatively high stability. The reinforcing plate 226 is provided with a first shading edge corresponding to the side of one light bar 2241, and the first shading edge coats a side corresponding to the reflector plate, the light guide plate and the optical film of the display module 22', so that light generated by the light bar 2241 may not be irradiated into the display module 22'. The reinforcing plate 226 is provided with a second shading edge corresponding to the side of the light bar of the display module 22', and the second shading edge coats a side corresponding to the optical film 2242, the light guide plate 2244 and the reflector plate 2243 of the display module 22, so that light generated by the light bar of the display module 22' may not be irradiated into the display module 22. Lights of the two display modules are separated by virtue of the first shading edge and the second shading edge.

In the fourth embodiment, both inner and outer wall surfaces of the heat radiating pipelines 2221 of the heat radiating structures 222 are provided with heat radiating fins 2223.

Figure 19:
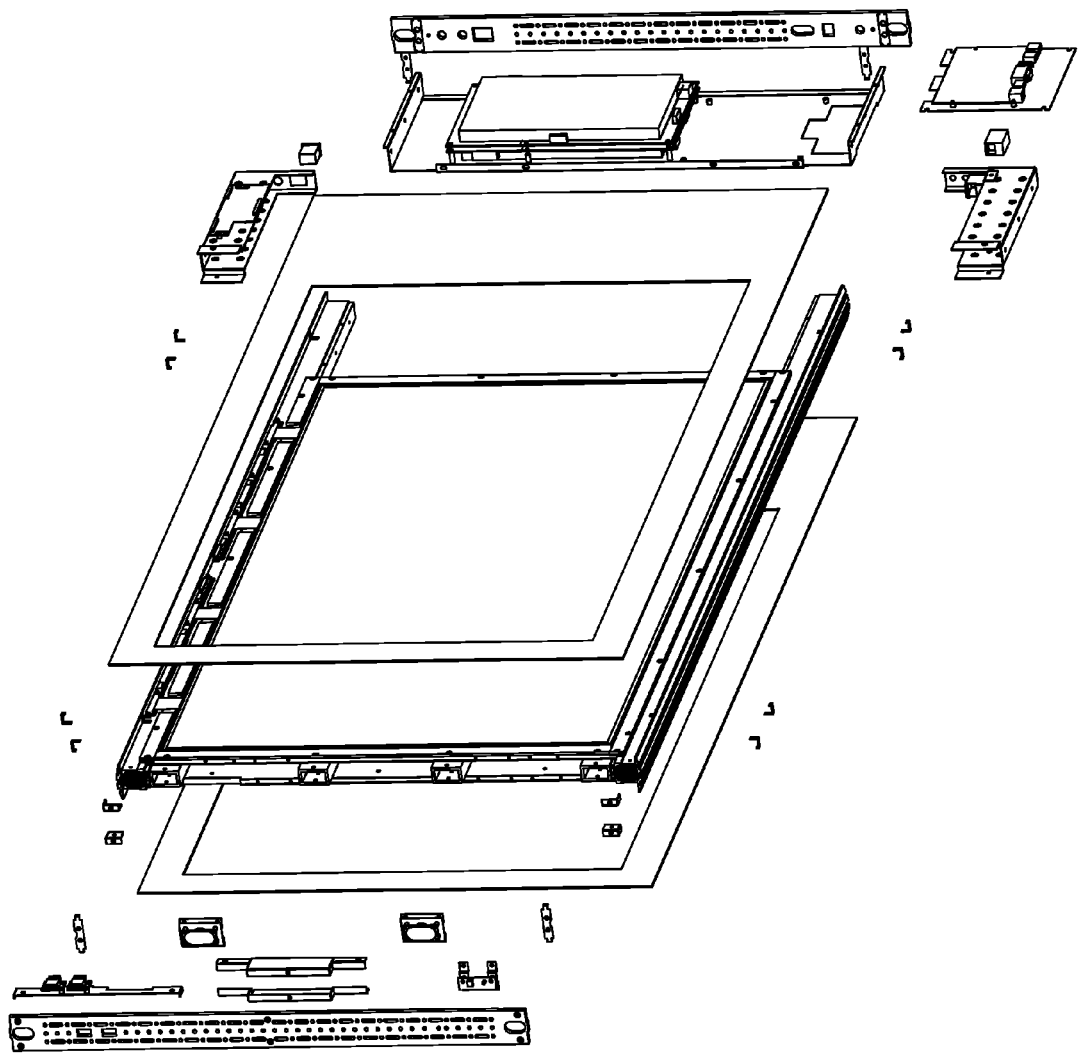
FIG. 19 is a schematic explosive structural view of the display device as shown in FIG. 13.

As shown in FIG. 13 to FIG. 18 in which external views of a product in the second embodiment of the display device provided by the present invention are shown, in combination with FIG. 19 in which an explosive structure of the display device is shown. According to the display device 20, the outer side of the display module is additionally provided with an outer frame including a top frame, a bottom frame, a front frame and a rear frame, the front frame and the rear frame are provided with openings corresponding to liquid crystal glass, and accordingly, protective glass is arranged at the openings. Openings, corresponding to the heat radiating pipelines, in the top frame and the bottom frame are also provided with air vents communicating with the outside, so that the heat radiating effects of the heat radiating pipelines are guaranteed. The heat radiating structures at two sides of the display module are located at two sides of the product and are used as side frames to be directly exposed to the outside, so that the heat radiating effects of the heat radiating structures are improved.

The present invention is described above in detail with reference to the embodiments of the accompanying drawings, and a person of ordinary skill in the art may make various modifications to the present invention according to the above description. Therefore, some details in the embodiments shall not constitute a limitation on the present invention, and the protection scope of the present invention shall be subject to the scope of the appended claims.

What is claimed is:

1. A display device, comprising an outer frame and a display module disposed in the outer frame, wherein sides of the outer frame are provided with heat radiating outlets; the display module comprises a mounting frame, heat radiating structures corresponding to the heat radiating outlets are formed on the mounting frame, and the heat radiating structures communicate with the outside by virtue of the heat radiating outlets and at least parts of the heat radiating structures extend from the heat radiating outlets to an outer side of the outer frame.

2. The display device according to claim 1, wherein the heat radiating structures are side frames of the outer frame.

3. The display device according to claim 1, wherein the display module further comprises a control component, and the control component is approximately spread along an arrangement direction of the heat radiating structures.

4. The display device according to claim 3, wherein the heat radiating structures are located at an outer side of the control component.

5. The display device according to claim 1, wherein the display module further comprises an extension section, a first end of the extension section is connected to the mounting frame, a second end of the extension section extends in a direction far away from the mounting frame, and the heat radiating structures are formed on the second end of the extension section.

6. The display device according to claim 1, wherein the heat radiating structures are hollow heat radiating pipelines, and two ends of the heat radiating pipelines are provided with openings communicating with inside and outside air.

7. The display device according to claim 6, wherein the heat radiating pipelines are vertically arranged.

8. The display device according to claim 6, wherein wall surfaces of the heat radiating pipelines are provided with heat radiating fins.

* * * * *